US006244561B1

(12) United States Patent
Hansen, III et al.

(10) Patent No.: US 6,244,561 B1
(45) Date of Patent: Jun. 12, 2001

(54) MODULATING EXPANSION VALVE

(75) Inventors: Charles C. Hansen, III, Hinsdale; John A. Yencho, Elmhurst; Jeffrey A. Mackowiak, Oak Lawn; Santosh Kumar, Woodridge, all of IL (US)

(73) Assignee: Hansen Technologies Corporation, IL (US)

( * ) Notice: Subject to any disclaimer, the term of this patent is extended or adjusted under 35 U.S.C. 154(b) by 0 days.

(21) Appl. No.: 09/227,429

(22) Filed: Jan. 8, 1999

Related U.S. Application Data
(60) Provisional application No. 60/072,376, filed on Jan. 9, 1998.

(51) Int. Cl.[7] .............................. F16K 31/02; F16K 31/42
(52) U.S. Cl. .................................... 251/30.02; 251/30.05; 251/63; 251/63.5; 251/121; 251/205
(58) Field of Search ..................... 251/26, 30.01, 251/30.02, 30.05, 33, 35, 43, 44, 45, 46, 120, 205, 63, 63.5, 63.6, 121

(56) References Cited

U.S. PATENT DOCUMENTS

| | | | | |
|---|---|---|---|---|
| 570,727 | * | 11/1896 | Gale ........................................ 251/26 |
| 2,417,994 | * | 3/1947 | Sheets .................................... 251/26 |
| 2,759,488 | * | 8/1956 | Garrett et al. .......................... 251/43 |
| 2,925,984 | * | 2/1960 | Kowalski ................................ 251/26 |
| 3,010,691 | * | 11/1961 | Canfield ................................. 251/26 |
| 3,399,689 | * | 9/1968 | Keane ................................. 251/30.02 |
| 3,533,434 | * | 10/1970 | Smith ...................................... 251/26 |
| 3,825,026 | * | 7/1974 | Salerno et al. ..................... 251/30.02 |
| 3,911,955 | * | 10/1975 | Link ................................... 251/30.02 |
| 3,957,244 | * | 5/1976 | Chauvigne ............................. 251/45 |
| 5,042,775 | * | 8/1991 | Willemsen ........................ 251/30.02 |
| 5,301,919 | * | 4/1994 | May ................................... 251/30.02 |
| 5,551,664 | * | 9/1996 | Boke ...................................... 251/44 |
| 5,887,847 | * | 3/1999 | Holborow ......................... 251/30.02 |
| 5,954,080 | * | 9/1999 | Leatherman ........................... 251/45 |

FOREIGN PATENT DOCUMENTS

0020611 * 9/1968 (JP) ................................. 251/30.02

\* cited by examiner

*Primary Examiner*—George L. Walton
(74) *Attorney, Agent, or Firm*—Patnaude & Videbeck

(57) ABSTRACT

An improved modulating expansion valve includes a housing having a high pressure side, a low pressure side and a piston reciprocally mounted in a portion positioned centrally therebetween. A manifold is sealingly mounted above the piston, and a high pressure control passageway extends from the valve inlets, through the manifold, to a chamber on top of the piston. A low pressure passageway extends from the chamber through the manifold to the valve outlet. A pair of electrically operated solenoids open and close the high and low pressure passageways to operate the valve. Substantially infinite control of the solenoids provide for modulating control of the valve in a semi-hermetically sealed expansion valve.

8 Claims, 2 Drawing Sheets

MODULATING EXPANSION VALVE

This application claims priority based upon Provisional Application Ser. No. 60/072,376, filed Jan. 9, 1998 and entitled "Modulating Expansion Valve."

The invention relates generally to expansion valve utilized in refrigeration systems and, more particularly, to an expansion valve for a refrigeration system controlled by a pair of electrically operated solenoid valves.

BACKGROUND OF THE INVENTION

Refrigeration systems consist of a refrigerant utilized in a cycle including a compressor, a condenser, an expansion valve and evaporator. While an expansion valve may potentially be as simple as an orifice, modern day refrigeration systems usually monitor the entire refrigeration cycle to optimize efficiency. Optimizing the efficiency in the condenser and in the evaporator entails providing an expansion valve having not only open and closed positions, but also a variety of partially open positions and a means for providing the correct optimum flow of refrigerant through the expansion valve. Presently known control apparatus used to operate a modulating expansion valve includes the use of an electric motor having an annular stator positioned on top of the valve and an armature positioned inside the hollow interior of the stator having a shaft in the center thereof which turns through a worm gear to raise and lower a regulating piston through the valve port. This type of motorized operator requires the use of shaft seals between the motor and the piston and thus provides an additional leak path to the atmosphere from the refrigeration system.

A need has arisen for an improved expansion valve for use in a refrigeration system that avoids the complexities of a motor operated expansion valve while providing simplicity of operation and a semi-hermetic seal between the valve and the atmosphere.

SUMMARY OF THE INVENTION

The invention resides in a modulating valve for use in controlling flow in a fluid system. The valve comprises a housing including a high pressure fluid inlet, a low pressure fluid outlet and a movable valve body positioned between the inlet and outlet. The valve body is adapted to move to open and close the valve and is biased in one of the open or closed positions. The invention further includes means having a first electrically operated pilot valve therein for providing controlled flow of fluid from the high pressure inlet of the housing to a portion of the valve body (above the piston) tending to move that valve body in a direction opposite its biased position. The invention further resides in means including a second electrically operated pilot valve for providing a control flow of fluid from the valve body (above the piston) to the low pressure outlet of the housing. This allows the valve body to move in a direction toward its biased position.

BRIEF DESCRIPTION OF THE DRAWINGS

The features of the present invention which are believed to be novel are set forth in the attached claims. The invention may best be understood by reference to the following description taken in conjunction with the accompanying drawings in which like numerals refer to like parts and in which:

DETAILED DESCRIPTION OF THE PREFERRED EMBODIMENT

Figure 1:
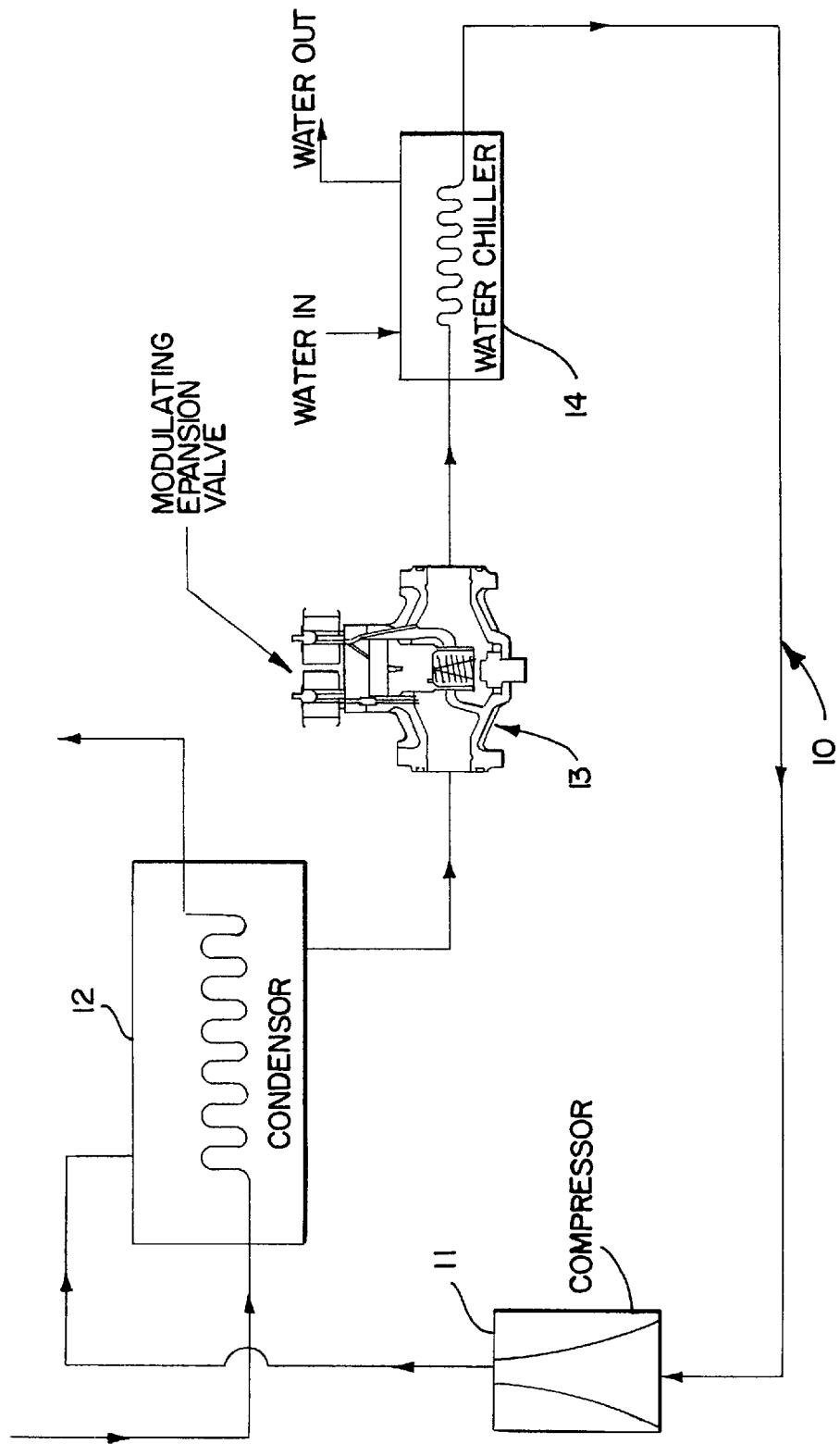
FIG. 1 is a diagrammatic view of a refrigeration system utilizing the modulating expansion valve of the present invention.

Referring to FIG. 1, a typical refrigeration system includes a closed cycle of flowing refrigerant 10, which passes through a compressor 11 into the high pressure side of the refrigeration cycle. From the compressor 11, the refrigerant passes through a condenser 12 and from there the refrigerant passes through the expansion valve, generally indicated at 13, constructed in accordance with the present invention, to regulate the flow of the fluid from higher pressure to lower pressure. After the expansion valve 13, the refrigerant is in the low pressure side of the refrigeration cycle and passes through the evaporator 14 or water chiller and thereafter back to the compressor to complete the cycle.

Figure 2:
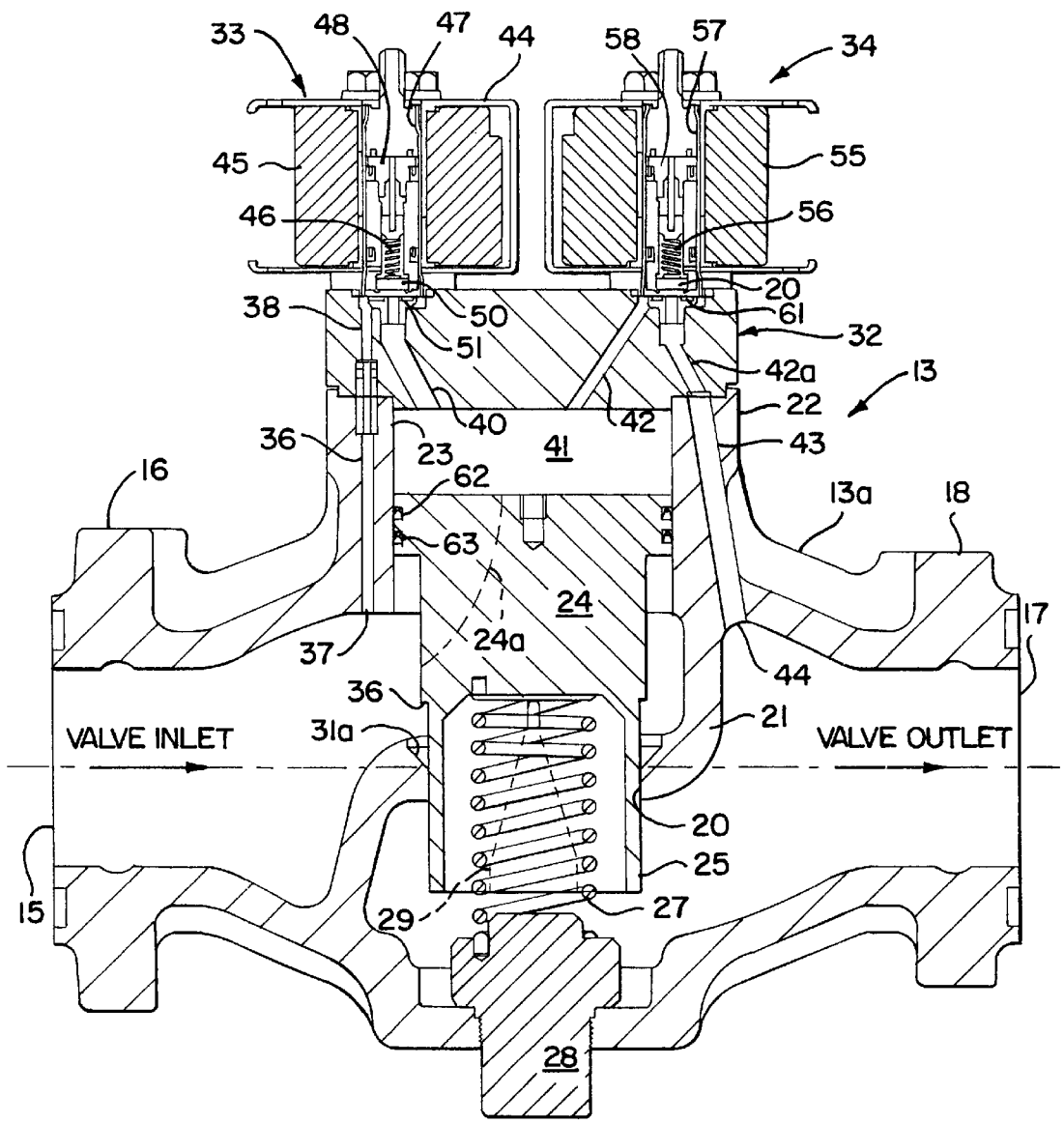
FIG. 2 is a vertical sectional view of the modulating expansion valve constructed in accordance with the present invention.

Referring to FIG. 2, the modulating expansion valve, generally indicated at 13, constructed in accordance with the present invention, is shown in more detail to include a housing 13a, constructed from a casting used for a typical globe valve, a high pressure inlet side defined by an inlet port 15 identified on the outside of the valve housing by annular inlet flange 16 therearound, a low pressure outlet port 17 identified outwardly on the valve housing 13a by annular outlet flange 18 therearound and an S-shaped path from the inlet port 15 to the outlet port 17. A circular port aperture or valve seat 20 is horizontally positioned through an S-shape dividing wall 21. Positioned between the inlet 15 and the outlet 17, a central or top annular housing portion 22 rises vertically as an annular flange from the center portion of valve housing 13a and includes a central bore 23 therein in which the top end of a cylindrical piston 24 is reciprocally mounted. Bottom annular end or skirt 25 of piston 24 is reciprocally received within the circular port 20 and divides the high pressure valve inlet from the low pressure valve outlet. Piston 24 is biased in an upward or open position by spring 27 mounted between the piston skirt 25 and a plug 28 positioned at the bottom of housing 13a. The annular sleeve 25 of piston 24 includes a plurality of triangulated cutout portions, one being typically shown at 29, which provide increased area for fluid to flow though port 20 as the piston 24 is raised and conversely provide decreasing flow area from the valve inlet to the valve outlet as the piston is lowered, until the piston is fully lowered to the point where the top of triangulated cutouts 29 are below port 20. At the top of port 20 is positioned an angular valve seat 31a that matingly sealingly engages an annular shoulder or valve seat 31b extending around a piston 24 when the piston is in its bottom-most position closing fluid flow through the valve 13.

The improvement of the present invention resides partly in a cap shaped cylindrical manifold 32, mounted on top of the annular central portion 22 of housing 13a and, also in an inlet electrical solenoid, generally indicated at 33, mounted on the high pressure side of the valve manifold 32, and in an electrical outlet solenoid, generally indicated at 34, mounted on the low pressure side of the manifold 32. The high pressure side of the annular central portion 22 of housing 13a also includes fluid passageway 36 extending from the high pressure inlet at 37 to the bottom of the manifold 32. The high pressure passageway continues in manifold 32 at passageway 38 which extends upwardly to the top of manifold 32. A continuation of the high pressure passageway 38 extends downwardly from the top of manifold 32 at passageway 40 which extends into the hollow piston chamber 41 beneath the manifold.

A low pressure fluid passageway from the piston chamber 41 extends through passageway 42 to the top of the low pressure side of manifold 32. The passageway then continues at passageway 42a down to the top of the low pressure side of the central annular portion 22 of housing 13a. A passageway 43 extends downwardly through the central housing portion 22 until it exits to the low pressure valve outlet at 44.

The high pressure or inlet electric solenoid 33 includes a housing 44 having an annular coil 45 positioned around it. Coil 45 is energized by electricity passing through it. The hollow central core 47 of solenoid 33 includes a metal core or plunger 48 which moves in a upward direction or open position when energized by the coil 47 and is biased in a downward or closed direction by a spring 46. The plunger 48 includes a working bottom end 50 which is sized to matingly engage an annular sealing ring 51 positioned at the top of high pressure passageway 40. Since the piston chamber 41 is of larger area than the port 20, flow through passageways 36, 38 and 40 moves the piston downwardly until the annular seat 31b on piston 24 sealingly engages annular seat 31a, thus closing the valve. Working bottom end 50, when seated cuts off refrigerant flow between high pressure passageway 38 and high pressure passageway 40. When there is no current through coil 45, the plunger 48 closes and moves downwardly in the hollow central core 47 to shut off high pressure fluid flow through passageway 36, 38 and 40 into the piston chamber 41.

The low pressure side of the expansion valve of the present invention is controlled by the low pressure electric solenoid 34 which like solenoid 33 includes an annular coil 55 energized by electricity through it. A hollow central core 57 in solenoid 34 includes a metal plunger 58 reciprocally mounted therein which has a lower working end 60 which sealingly engages annular sealing ring 61 positioned at the top of low pressure passageway 43. When plunger 58 is de-energized in its downward position, it seals and cuts off low pressure fluid flow between passageways 42, 42a and 43, thus preventing any movement upwardly of the piston 24 through the chamber 41. As solenoid 34 is energized, the plunger 58 moves upwardly and allows movement of fluid through passageway 42, 42a, 43 and out 44 to the low pressure side of the valve outlet 17. Energization of solenoid 34 allows the piston 24 to move upwardly because of the bias from spring 27, and opens the expansion valve by increasing the opening area defined by the Y-shaped cutouts 29 in the skirt 25 of piston 24.

The position of the piston 24 in the valve 13 and hence the refrigeration flow through it is controlled by operating the inlet solenoid 33 and the outlet solenoid 34. The inlet solenoid controls the passage 36, 38, 40 connecting the inlet of the main high pressure side of the valve to the chamber 41 above the regulating piston 24. The outlet solenoid 34 controls the passage 42, 42a, 43 and 44 connecting the chamber 41 at the top of the regulating piston 24 to the outlet 17 of the valve 13. The refrigerant flow through valve 13 is a function of the position of the regulating piston 24 in the valve bore 41. As the piston 24 moves upwardly in the bore 23, the characterized open area 29 available for flow increases, and as a result, the refrigerant flow rate goes up. The flow reduces as the piston 24 moves down. The downward motion of the piston 24 can be effected by the opening the inlet solenoid 33 while leaving the outlet solenoid 34 closed. This causes the refrigerant to flow from the inlet 15 of the valve to the chamber 41 at the top of the piston 24. Because the area of the bore 23 is greater than the port area 20, higher inlet pressure acting on top of piston 24 causes the piston to start moving downward, thereby reducing the flow. Opening the inlet solenoid 33 with the outlet solenoid 34 closed will eventually lead to closing of the valve as the piston 24 at the lowermost point of its downward stroke will seal against the port 20. The piston 24 can be made to hold position at any point between wide open (topmost position) to completely shut (bottommost position) thus regulating or modulating the flow rate. This can be effected by controlling the amount of time that the inlet and outlet solenoids are open and hence prevent the piston 24 from moving in the upward or downward direction. This control or modulation can be effected by commercially available controllers. For example, a rapidly moving flip flop will excite solenoids 33 and 34 as desired, to position the piston 24 in bore 23 wherever one wants. The reaction time of the valve can be controlled by the size of the orifices included in the inlet and outlet solenoid valve as shown in FIG. 2. The larger the orifice, the faster is the reaction time and vice versa. Reaction time refers to the time required by the piston 24 to traverse a certain distance within the bore 23. Desired reaction times can be obtained by selecting the appropriate orifice size. The regulating piston 24 is provided with spring loaded teflon seals at 62–63 to seal against the bore 23 and thus prevent a leak path from the chamber 41 at the top of the piston 24 to the outlet 17 of the valve 13. A leak path from the chamber 41 at the top of the piston to the outlet of the valve 17 will prevent the valve from closing.

In the event of a power failure with plungers 48 and 58 closing their respective passageways, a tiny passageway 24a in piston 24 bleeds refrigerant from high pressure inlet 15 to chamber 41 and causes piston 24 to slowly move downward and shut off the valve as a fail safe position. Alternatively, one of the solenoid valves can be of the normally open variety rather than normally closed. Depending upon which solenoid is normally open, a power failure can cause the expansion valve to fail in either the closed or open position.

Thus, a typical chiller application has been shown in which the modulating expansion valve of the invention has been shown. This invention enables controlling the flow rate through the condenser and thus effectively accounts for system load changes. The inlet and outlet solenoids 33, 34, respectively, being integral with the valve 13, can be controlled by any commercially available controllers or typical plant computers.

The advantages that this modulating control valve 13 has is that it is semi-hermetic in construction and minimizes leak paths to the atmosphere. Also, it is simpler and less complex than presently available motor operators mounted on similar valves that open and close the valve with a shaft having seals. Thus, an improved modulating expansion valve has been shown and described in connection with the present invention.

It will be understood by those skilled in the art that changes and modifications may be made without departing from the true spirit and scope of the present invention. It is the intent of the appended claims to cover all such changes and modifications which fall within the true spirit and scope of the invention.

What is claimed:

1. A modulating expansion valve for controlling refrigerant fluid flow comprising:

a globe valve housing including a high pressure inlet port, a low pressure outlet port, a curved dividing wall having an aperture therethrough, said dividing wall being positioned between said inlet port and said outlet port, including an aperture therebetween, and a generally cylindrical annular flange extending in axial alignment with said aperture, a generally cylindrical piston reciprocally mounted in said annular flange including a foraminous skirt extending through said aperture for variably opening and closing same, means for biasing said piston in an upward direction, an enclosure over a top opening of said annular flange defining a chamber with said annular flange and a top or said piston, first passageway means in said housing and said enclosure for allowing fluid flow from said high pressure inlet port into said chamber for moving said piston therein opposite said biasing direction causing said foraminous skirt to vary the fluid flow rate through said aperture, a first solenoid on said enclosure controlling the flow of fluid through said first passageway, second passageway means in said housing and said enclosure for allowing fluid flow from said chamber into said low pressure outlet port for allowing said biasing means to move said piston, and allowing said foraminous skirt to vary the fluid flow rate through said aperture, and a second solenoid on said enclosure controlling the flow of fluid through said second passageway.

2. In an electrically controlled refrigerant fluid operated modulating expansion valve including:

a globe valve housing including a high pressure fluid inlet, a low pressure fluid outlet and a dividing wall positioned therebetween, said dividing wall having an aperture therethrough, a valve member mounted on said housing for closing said valve when said valve member is substantially extended through said aperture and opening said valve when said valve member is substantially withdrawn from said aperture, said valve housing including a bore therein extending inwardly from an external face on said housing to said high pressure inlet side thereof and being axially aligned with said aperture through said dividing wall, an improvement comprising:

said valve member defining a piston reciprocally mounted in said bore, having a top defining a chamber with said bore and a foraminous skirt extending through said aperture through said dividing wall, bias means positioned adjacent a bottom of said housing and a bottom of said piston for urging said piston to an upward open position minimizing the size of said chamber, a manifold mounted on said housing external face to cover a top of said chamber, first and second solenoids mounted on said manifold, a high pressure passageway from said high pressure fluid inlet through said manifold to said chamber, a low pressure passageway from said chamber, through said manifold to said low pressure fluid outlet, said first solenoid including a plunger in operative communication with said high pressure passageway for opening and closing same, said second solenoid including a plunger in operative communication with said low pressure passageway for opening and closing same, the flow of fluid through said high pressure passageway to said chamber causing said piston to extend downwardly in a modulating manner through said aperture to variably close said valve, and the flow of fluid through said low pressure passageway to said low pressure fluid outlet causing said piston to withdraw from said aperture in a modulating manner to variably open said valve.

3. The electrically controlled fluid operated modulating valve as defined in claim 2 wherein, said high pressure passageway extends through said valve housing from said high pressure fluid inlet to said housing external face.

4. The electrically controlled fluid operated modulating valve as defined in claim 2 wherein, said low pressure passageway extends through said valve housing from said high pressure fluid inlet to said housing external face.

5. The electrically controlled fluid operated modulating valve as defined in claim 3 wherein, said high pressure passageway extends in said manifold from a position in fluid communication with said high pressure passageway in said valve housing at said external face to said first solenoid to said chamber.

6. The electrically controlled fluid operated modulating valve as defined in claim 4 wherein, said low pressure passageway extends in said manifold from a position in fluid communication with said low pressure passageway in said valve housing at said external face to said second solenoid to said chamber.

7. The electrically controlled fluid operated modulating valve as defined in claim 2 wherein, one of said first and said second solenoids includes a plunger of normally (de-energized) open position.

8. In an electrically controlled refrigerant fluid operated modulating expansion valve including:

a globe valve housing including a high pressure fluid inlet, a low pressure fluid outlet and a dividing wall positioned therebetween, said dividing wall having an aperture therethrough, a valve member mounted on said housing for closing said valve when said valve member is substantially extended through said aperture and opening said valve when said valve member is substantially withdrawn from said aperture, said valve housing including a bore therein extending inwardly from a top external face on said housing to said high pressure inlet side thereof and being axially aligned with said aperture through said dividing wall, an improvement comprising:

said valve member defining a piston reciprocally mounted in said bore, having a top defining a chamber with said bore and a foraminous skirt extending through said aperture through said dividing wall, bias means between said housing and said piston for urging said piston to an upward open position minimizing the size of said chamber, a manifold mounted on said housing top external face to cover said chamber, first and second solenoids mounted on said manifold, a high pressure passageway from said high pressure fluid inlet through said manifold to said chamber, a low pressure passageway from said chamber, through said manifold to said low pressure fluid outlet, said first solenoid including a plunger in operative communication with said high pressure passageway for opening and closing same, said second solenoid including a plunger in operative communication with said low pressure passageway for opening and closing same, the flow of fluid through said high pressure passageway to said chamber causing said piston to extend downwardly in a modulating manner through said aperture to variably close said valve, the flow of fluid through said low pressure passageway to said low pressure fluid outlet causing said piston to withdraw from said aperture in a modulating manner to variably open said valve, said high pressure passageway extends through said valve housing from said high pressure fluid inlet to said housing external face, said low pressure passageway extends through said valve housing from said high pressure fluid inlet to said housing external face, said high pressure passageway extends in said manifold from a position in fluid communication with said high pressure passageway in said valve housing at said top external face to said first solenoid to said chamber, said low pressure passageway extends in said manifold from a position in fluid communication with said low pressure passageway in said valve housing at said external face to said second solenoid to said chamber, and one of said first and said second solenoids includes a plunger of normally (de-energized) open position.

* * * * *